Patented Oct. 6, 1953

2,654,749

UNITED STATES PATENT OFFICE 2,654,749

SALTS OF PENICILLIN WITH DIMETHYL-AMINO, DIPHENYL-SUBSTITUTED ESTERS

Harley W. Rhodehamel, Jr., Indianapolis, Ind., assignor to Eli Lilly and Company, Indianapolis, Ind., a corporation of Indiana No Drawing. Application February 13, 1952,
Serial No. 271,443

3 Claims. (Cl. 260—239.1)

This invention relates to novel penicillin salts and the preparation thereof.

I have discovered that members of the group consisting of β-dimethylaminoethyl benzilate and 1-dimethylamino-2-diphenylacetoxyethane or their salts can be combined with penicillin or its salts by neutralization or metathetical reactions to form sparingly soluble penicillin salts, thereby affording a means of precipitating penicillin from solution, and of purifying penicillin. Moreover, the novel penicillin salts can be utilized therapeutically. A prolonged penicillin blood level can be secured upon administering the salts parenterally by methods known to the medical art.

The salt-forming compounds of the present invention are represented by the formula:

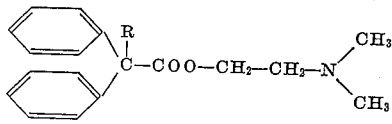

wherein R represents hydrogen or hydroxyl. The compounds can be prepared by the esterification procedures known to the art.

The following examples illustrate the preparation of the novel salts of this invention:

Example 1

To a solution of 2 g. of penicillin (e. g. a commercial mixture of the several penicillins) dissolved in 25 ml. of amyl acetate are added 2 g. of β-dimethylaminoethylbenzilate dissolved in 30 ml. of amyl acetate. The mixture is cooled and stirred occasionally whereupon the β-dimethylaminoethyl benzilate salt of penicillin precipitates. The salt is isolated as by decantation or filtration, and dried in vacuo.

The salt is represented by the following formula in which P represents penicillin:

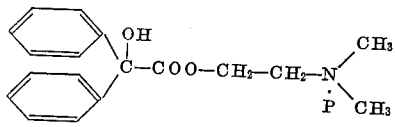

Example 2

To an aqueous solution of 0.3 g. of the potassium salt of penicillin G in 1.8 ml. of water is added a solution of 0.3 g. of β-dimethylaminoethyl benzilate hydrochloride in 5 ml. of water. The mixture is cooled and stirred occasionally whereupon the slightly soluble β-dimethylaminoethyl benzilate salt of penicillin G precipitates. The salt is separated, and dried in vacuo.

Example 3

To an aqueous solution of 0.3 g. of the potassium salt of penicillin G in 1.8 ml. of water is added a solution of 0.3 g. of 1-dimethylamino-2-diphenylacetoxyethane hydrochloride in 15 ml. of water. The mixture is cooled and stirred occasionally whereupon the slightly soluble 1-dimethylamino-2-diphenylacetoxy salt of penicillin G precipitates. The salt is separated, and dried in vacuo.

The salt is represented by the following formula in which P represents penicillin:

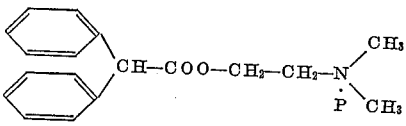

I claim:

1. A salt of penicillin with a compound represented by the formula:

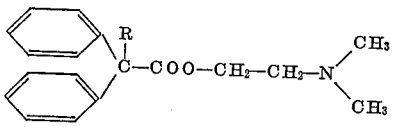

wherein R represents a member of the group consisting of hydrogen and hydroxyl.

2. The β-dimethylaminoethyl benzilate salt of penicillin G.

3. The 1-dimethylamino-2-diphenylacetoxyethane salt of penicillin G.

HARLEY W. RHODEHAMEL, JR.

References Cited in the file of this patent

UNITED STATES PATENTS

| Number | Name | Date |
|---|---|---|
| 2,515,898 | Rhodehamel | July 18, 1950 |

FOREIGN PATENTS

| Number | Country | Date |
|---|---|---|
| 659,775 | Great Britain | Oct. 24, 1951 |

OTHER REFERENCES

Ballaro: "Ciencia e Investigacion," vol. 4, Nov. 1948, pp. 481, 482.

Rhodehamel: "J. Am. Chem. Soc.," vol. 73, Dec. 1951, p. 5902.